United States Patent [19]
Heiss

[11] Patent Number: 5,754,529
[45] Date of Patent: May 19, 1998

[54] METHOD AND CIRCUIT ARRANGEMENT FOR FORWARDING MESSAGE UNIT CELLS SUPPLIED FROM AN ATM COMMUNICATION EQUIPMENT

[75] Inventor: Herbert Heiss, Germering, Germany

[73] Assignee: Siemens Aktiengesellschaft, Munich, Germany

[21] Appl. No.: 531,704

[22] Filed: Sep. 21, 1995

[30] Foreign Application Priority Data

Sep. 28, 1994 [DE] Germany ............... 44 34 724.3

[51] Int. Cl.$^6$ .................................................. H04J 3/16
[52] U.S. Cl. ..................... 370/232; 370/468; 370/395
[58] Field of Search ............................... 370/229, 230, 370/232, 233, 234, 395, 399, 468, 235, 412

[56] References Cited

U.S. PATENT DOCUMENTS

| 5,278,825 | 1/1994 | Wallmeier et al. |         |
|-----------|--------|------------------|---------|
| 5,295,135 | 3/1994 | Kammerl          | 370/233 |
| 5,400,336 | 3/1995 | Boyer et al.     | 370/233 |
| 5,524,006 | 6/1996 | Hluchyj et al.   | 370/233 |
| 5,629,937 | 5/1997 | Hayeer et al.    | 370/233 |

FOREIGN PATENT DOCUMENTS

| 0 498 092 A1 | 8/1992 | European Pat. Off. |
| 0 660 557 A1 | 6/1995 | European Pat. Off. |

Primary Examiner—Chau Nguyen
Attorney, Agent, or Firm—Hill, Steadman & Simpson

[57] ABSTRACT

In a method and circuit arrangement for forwarding message cells supplied by an ATM communication equipment unit, a peak bit rate as well as an upper limit for an average bit rate and a burst tolerance are determined as characteristic parameters for at least a part of the virtual connections proceeding via the ATM communication equipment. For forwarding the message cells belonging to these virtual connections, a minimum delay time by which the forwarding of a message cell is at least delayed is calculated according to the criterion of the plurality of message cells incoming and outgoing per time unit during the course of the respective virtual connection, taking the peak bit rate into consideration. On the other hand, a maximum delay time by which the forwarding of a message cell is to be at most delayed is calculated according to the criterion of the plurality of message cells incoming and outgoing per time unit during the course of the respective virtual connection taking the upper limit of the average bit rate into consideration. Taking the calculated minimum and maximum delay time into consideration, finally a delay time is determined for forwarding a message cell present at the moment.

8 Claims, 2 Drawing Sheets

METHOD AND CIRCUIT ARRANGEMENT FOR FORWARDING MESSAGE UNIT CELLS SUPPLIED FROM AN ATM COMMUNICATION EQUIPMENT

BACKGROUND OF THE INVENTION

The invention is directed to a method and to a circuit arrangement forwarding message cells supplied via at least one offering trunk by an ATM communication equipment unit working according to an asynchronous transfer mode during virtual connections to a serving trunk that comes into consideration for a respective virtual connection on which a periodically repeating time frame having a respective plurality of time slots is determined for forwarding of message cells. Such a method and such a circuit arrangement are already disclosed by EP 0 498 092 A1 corresponding to U.S. Pat. No. 5,278,825. A peak bit rate is determined therein as a characteristic parameter for the individual virtual connections. A time slot wherein a message cell present at the moment is to be forwarded is thus identified for every incoming message cell dependent on the peak bit rate determined for the corresponding virtual connection and on the temporal spacing of the message cells belonging to the same virtual connection and intended for forwarding. However, a forwarding of message cells only occurs when a time slot that does not exceed a predetermined temporal spacing from the current point in time is found for these message cells.

Beyond this, a method for statistical multiplexing of message cells that are transmitted with a constant length according to an asynchronous transfer method during the course of virtual connections has been disclosed by European Published Patent disclosure 660557A1 (corresponding to U.S. Ser. No. 08/353,695 now U.S. Pat. No. 5,526,345), in an arrangement wherein a plurality of input lines and output lines are established. A minimum message cell transmission rate and a maximum number of message cells exceeding the message cell transmission rate are thereby determined for every virtual connection. Beyond this, message cell cycles are defined by the transmission duration of a message cell given a defined transmission bit rate, a plurality of message cells being capable of being respectively supplied on the input lines, and at most one message cell being capable of being forwarded on the output line therein.

A memory means having a plurality of memory locations each respectively accepting one message cell belongs to the arrangement. A time axis formed with a plurality of memory elements is established in this memory means, said time axis being progressively cyclically driven by a time indicator with every message cell cycle. A time rank that indicates by which latest allowable point in time the respective message cell must be forwarded is determined for every incoming message cell upon interpretation of the quantities determined for the corresponding virtual connection. The respective message cell is thereby stored in a memory location whose address is stored in the memory element of the time axis that corresponds to the identified time rank. When an entry in a memory element selected by the time indicator references the memory location of a message cell, this message cell is entered into a read-out list for immediate forwarding onto the output line. When no message cell is entered in the read-out list in the momentary message cell cycle, an entry of only the one message cell into the read-out list is effected and a read counter progresses in the time axis up to the entry for a message cell with the following time rank. When a time rank that lies between the momentary position of the time indicator and the read pointer is calculated for an incoming message cell, this message cell is immediately entered into the read-out list.

SUMMARY OF THE INVENTION

It is an object of the present invention to disclose a way of how a method and a circuit arrangement of the type initially cited can be designed so that transmitted message cells can be forwarded via an output line during the course of virtual connections for which characteristic parameters deviating compared to the Prior Art are defined.

According to the invention, a method is provided for forwarding message cells supplied via at least one offering trunk by an ATM communication equipment unit working according to a asynchronous transfer mode during virtual connections to a serving trunk that comes into consideration for a respective virtual connection and on which a periodically repeating time frame having a respective plurality of time slots is determined for forwarding of message cells. Parameters characteristic of the respective virtual connection are determined during the course of the call set-up. The message cell stream of the respective virtual connection is defined by the parameters, and, based on the criterion of the characteristic parameters and on the plurality of message cells incoming and outgoing per unit time during the course of the respective virtual connection, a preferred time slot is calculated for every arriving message cell for the forwarding thereof. The respective message cell is inserted into an output list allocated to the time slot to be used. The output lists allocated to the individual time slots are successively selected for a forwarding of the message cell or message cells, respectively contained therein. A peak bit rate as well as an upper limit for an average bit rate and a burst tolerance are respectively determined as characteristic parameters at least for a first type of virtual connection. A minimum delay time by which the forwarding of a message cell that has just been supplied is at least delayed is calculated, on the one hand, according to the criterion of the plurality of message cells incoming and outgoing per time unit during the course of the respective virtual connection taking the peak bit rate into consideration. A maximum delay time by which the forwarding of a message cell that has just been supplied is to be at most delayed is calculated, on the other hand, according to the criterion of the plurality of message cells incoming and outgoing per time unit during the course of the respective virtual connection taking the upper limit of the average bit rate into consideration. A delay time and, thus, the time slot in which the corresponding message cell is to be forwarded is determined taking the minimum and the maximum delay time into consideration. The advantage of the invention is that the forwarding of message cells via the corresponding output line occurs to the farthest-reaching extent in accordance with the characteristic parameters determined for the respective virtual connection and, thus, adherence to the individual characteristic parameters can be monitored separately in following equipment.

Also, according to the invention, the delay time is calculated as a whole plurality of time slots. A message cell is only forwarded when a delay time greater than zero has been calculated for it. The advantage of this development is that, by delaying a message cell to be forwarded by at least one time slot, the control events in conjunction with the acceptance of message cells and the control events for the forwarding of these message cells can be implemented in parallel.

According to a circuit arrangement of the invention, message cells are forwarded which are supplied via at least one offering trunk by an ATM communication equipment unit working according to a synchronous transfer mode during the course of virtual connections to a serving trunk that comes into consideration for the respective virtual connection and on which a periodically repeating time frame having a respective plurality of time slots is determined for the forwarding of message cells. Parameters characteristic of the respective virtual connection are determined during the course of the call set-up. The message cell stream of the respective virtual connection is defined by the parameters. Based on the criterion of the characteristic parameters and on the plurality of message cells incoming and outgoing per time unit during the course of the respective virtual connection, a preferred time slot is calculated for every arriving message cell for the forwarding thereof. The respective message cell is inserted into an output list allocated to the time slot to be used. The output lists allocated to the individual time slots are successively selected for a forwarding of the message cell or message cells respectively contained therein. Means is provided for outputting characteristic parameters for the respective virtual connection with respect to a peak bit rate as well as an upper limit for an average bit rate, and a burst tolerance is provided at least in a part of the subscriber equipment unit connected to the ATM communication equipment unit. Handling means are allocated to the respective serving trunk, the handling means being designed such that a minimum delay time by which the forwarding of a message cell that has just been supplied is at least delayed is calculated according to the criterion of the plurality of message cells incoming and outgoing per time unit during the course of the respective virtual connection taking the peak bit rate into consideration. A maximum delay time by which the forwarding of a message cell that has just been supplied is to be at most delayed is calculated according to the criterion of the plurality of message cells incoming and outgoing per time unit during the course of the respective virtual connection taking the upper limit of the average bit rate into consideration. A delay time and, thus, the time slot in which the corresponding message cell is to be forwarded, is determined taking the minimum and the maximum delay time into consideration. The advantage of this circuit arrangement as well as of the expedient developments thereof is the relatively low circuit-oriented expense in order to implement the message cells supplied to this circuit arrangement upon retention of the characteristic parameters determined for the individual virtual connections.

DESCRIPTION OF THE PREFERRED EMBODIMENTS

Figure 1:
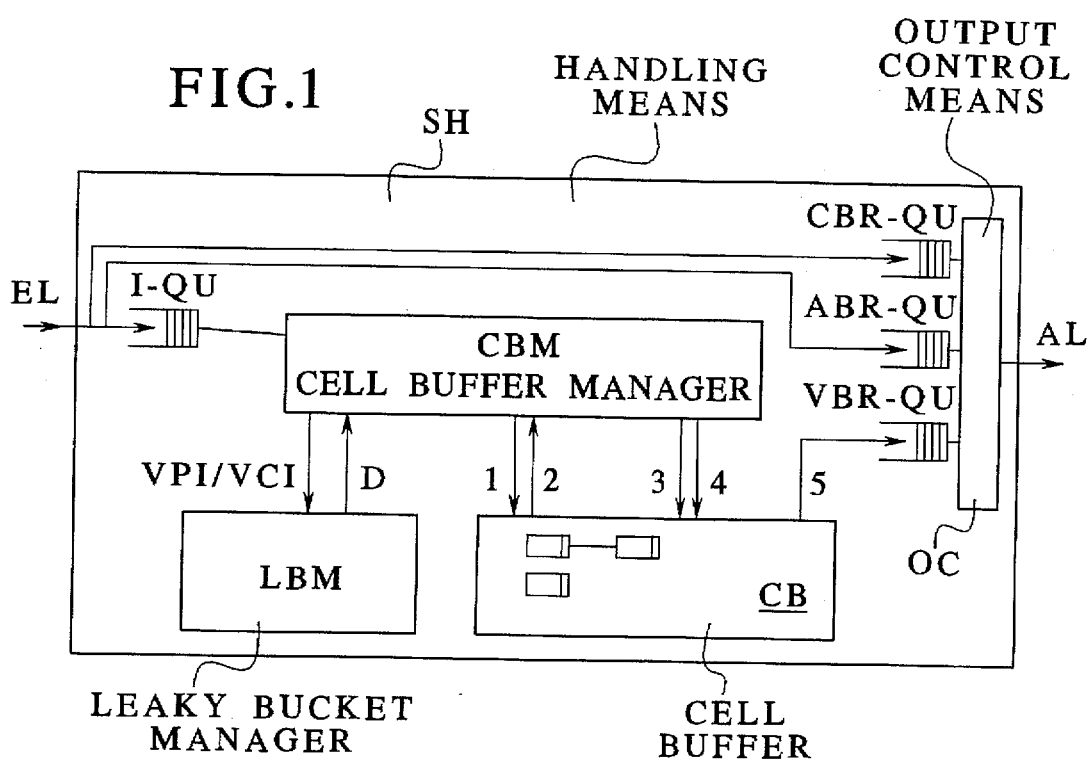
FIG. 1 shows a block circuit diagram of a circuit arrangement wherein the present invention is applied.

FIG. 1 schematically shows the structure of a handling means SH that, for example, can be allocated to an output line of an ATM communication equipment unit working according to an asynchronous transfer mode in order to forward the message cells supplied to this communication equipment unit via input lines during the course of virtual connections via the corresponding output line according to a statistical multiplexing principle. The ATM communication equipment unit can be an ATM switching equipment unit, referred to as an ATM cross-connect or an ATM multiplexer means.

In a known way, the message cells supplied to the handling means SH comprise a fixed length and, in addition to having an information part for the transmission of the actual useful information, have a respective cell header wherein, among other things, particulars with respect to the respective virtual connection or the respective virtual path are contained. Let the respective connection be identified by what is referred to as a virtual channel number VCI and, by contrast, let a virtual path be identified by what is referred to as a virtual path number VPI. The length of such a cell header comprises, for example, 5 octets. The information part, by contrast, is formed of 48 octets in order to transmit the actual useful information. What should thereby be generally understood by useful information are message signals in digital form, these including, for example, message and text signals as well as voice or video signals in digital form. Appropriate dummy cells are transmitted in the rest of the message cells in transmission pauses.

It shall be assumed below that the handling means SH is supplied with message cells that belong to virtual connections having different traffic characteristics. Let first connections, referred to below as CBR connections, be defined merely by a fixed peak bit rate, whereas second connections referred to as VBR connections are characterized by a peak bit rate, an upper limit of an average bit rate (sustainable bit rate), as well as a burst tolerance. Other connections that deviate from the connections in view of the traffic characteristic are referred to as ABR connections. The traffic characteristic is thereby determined during the course of the setup of the respective virtual connection by having the subscriber equipment unit that requests this connection indicate the characteristic parameters. These characteristic parameters are retained in call-associated fashion in the handling means SH, namely in a leaky bucket manager LBM yet to be explained.

According to FIG. 1, the message cells belonging to CBR connections and ABR connections from among the message cells supplied to the handling means SH via an input line are directly supplied to a CBR or an ABR output queue CBR-QU or ABR-CU according to the criterion of the VPI/VCI carried therein. These two output queues have their output side in communication with an output control means DC under whose control the message cells are successively forwarded to an output line AL connected to the handling means SH, being forwarded in a way yet to be set forth in detail below in time frames that periodically repeat and that each respectively comprises m time slots. Let the time slots allocated to a time frame be referenced with 0 through m−1. The time duration of a time slot thus corresponds to the transmission time duration of a message cell on the output line, i.e. one message cell is forwarded per time slot. The time duration of a time slot is also referred to as cell cycle below.

Based on the criterion of the VPI/VCI carried therein, message cells belonging to VBR connections, by contrast, are first supplied to an input queue I-QU. Of the message cells contained therein, only a defined plurality are thereby conducted per cell cycle to a cell buffer manager CBM and intermediately stored therein at first. A copy of the VPI/VCI contained in these message cells is forwarded for interpretation to a leaky bucket manager LBM. With reference to the characteristic parameters retained for the respective virtual connection, this leaky bucket manager LBM, based on the criterion of the plurality of incoming and outgoing message cells per time unit during the course of the respective virtual connection and taking the peak bit rate into consideration, determines, on the one hand, the point in time at which a message cell that was just supplied is to be forwarded at the earliest. Based on the criterion of the plurality of message cells incoming and outgoing per time unit during the course of the respective virtual connection, and taking the upper limit of the average bit rate into consideration, on the other hand, the point in time is calculated at which a message cell that has just been supplied is to be forwarded at the latest. A delay time D by which the message that has just been supplied is to be delayed taking the current time T into consideration, i.e. in which time slot the message cell is to be finally forwarded, is identified on the basis of these identified points in time. In the present exemplary embodiment, this delay time is thereby indicated in a whole-numbered plurality of time slots.

Particulars with respect to the delay time D calculated by the leaky bucket manager LBM are supplied to the cell buffer manager CBM (in FIG. 1). Given a delay time D=0, the message that is present at the moment is thereby discarded. Given a delay time D>0, by contrast, the corresponding message cell is intermediately stored in a cell buffer CB (1 in FIG. 1). This cell buffer comprises a plurality of memory locations in which respectively one message cell as well as one address pointer can be stored. With the assistance of these address pointers, memory locations can be chained with one another to form a memory list in which another memory location is addressed by the address pointer stored in the one memory location. Among other things, a memory list referred to as free list is kept in this way, all memory locations not occupied at the moment being chained with one another therein. The first memory location kept in this free list is thereby de-chained in order to store the message cell present at the moment therein. An address pointer indicating this memory location is supplied to the cell buffer manager CBM (2 in FIG. 1). Beyond this, the cell buffer manager CBM determines the time slot at which the message cell is to be forwarded, making this determination on the basis of the current time T and the particulars with respect to the delay time D supplied by the leaky bucket manager LBM. With the assistance of the address pointer, that memory location which contains the message cell that has just been stored is enchained into a read-out list ("chain') (3 in FIG. 1) allocated to the identified time slot. This occurs in that the address pointer is stored in the momentarily last memory location of the read-out list, and a defined information indicating the end of the read-out list is entered as address pointer in the memory location that was just added to the chain.

Figure 2:
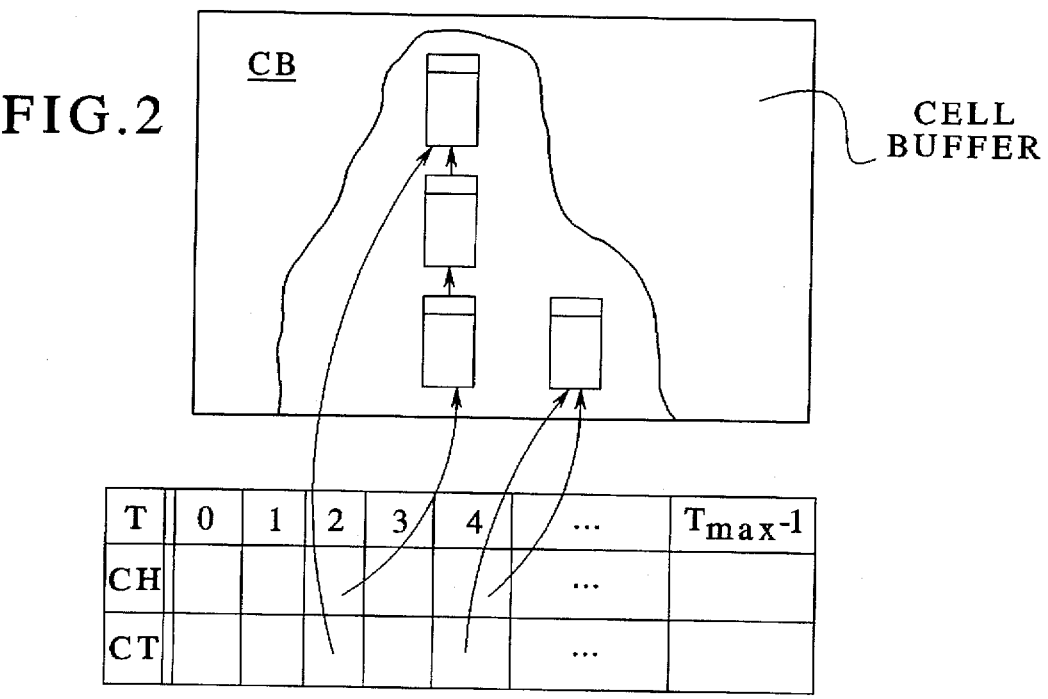
FIGS. 2 and 3 show flowcharts that shall be discussed in greater detail below.

A time table schematically shown in FIG. 2 that has a plurality of memory elements corresponding in number to the plurality of m time slots belonging to an afore-mentioned time frame is provided in the cell buffer manager CBM for the administration of the read-out lists allocated to the individual time slots. Two information items are thus stored in the memory element allocated to a time slot, namely an address pointer CH that indicates a memory location representing the start of the corresponding read-out list as well as an address pointer CT that indicates a memory location representing the end of the corresponding read-out list. Two such read-out lists stored in the cell buffer CB are additionally indicated in FIG. 2. Three memory locations are contained in the first read-out list allocated to the time slot 2, so that different addresses are entered in the corresponding address pointers CH and CT. By contrast thereto, the read-out list allocated to the timeslot 4 comprises only a single memory location, so that the corresponding address pointers CH and CT indicate the same memory location.

The control events upon acceptance of message cells into the handling means SH and the chronological ordering of these message cells for the forwarding involved therewith having been set forth above, the forwarding of the message cells stored in the cell buffer CB shall now be discussed in greater detail.

A modulo-m counter means corresponding to the plurality m of time slots existing in a time frame is provided in the cell buffer manager CBM, the momentary counter reading of this modulo-m counter means indicating the current time T and being incremented by the value 1 at every beginning of a cell cycle. Based on the criterion of this momentary counter reading, the time table shown in FIG. 2 is driven in order to read out the address pointers allocated to the current time T. When these address pointers indicate the presence of at least one memory location in the read-out list and, thus, at least one message cell to be forwarded, that read-out list of the cell buffer CB that comes into consideration is selected under the control of the cell buffer manager CBM (4 in FIG. 1) in order to supply the message cell or message cells stored under the memory location or locations to a VBR output queue VBR-QU (5 in FIG. 1) that is provided for the afore-mentioned VBR connections and has its output side connected to the output control means OC (FIG. 1). Following thereupon, the time table in FIG. 2 is updated in that a value indicating the empty condition of the read-out list is entered for the address pointers CH and CT. The memory locations belonging to the previous read-out list are also en-chained into the afore-mentioned free list.

The output control means OC (FIG. 1) is designed such in the present exemplary embodiment such that only one message cell is forwarded in each time slot. A priority control is thereby implemented by the output control means OC in that message cells stored in the CBR output queue CBR-QU have priority over message cells of the VBR output queue VBR-QU, and the latter in turn have priority over message cells of the ABR output queue ABR-QU. In other words, message cells of the VBR output queue VBR-QU are only forwarded when the CBR output queue CBR-QU is empty. Message cells of the ABR output queue ABR-QU, by contrast, are only considered when the two other output queues are empty.

Figure 3:
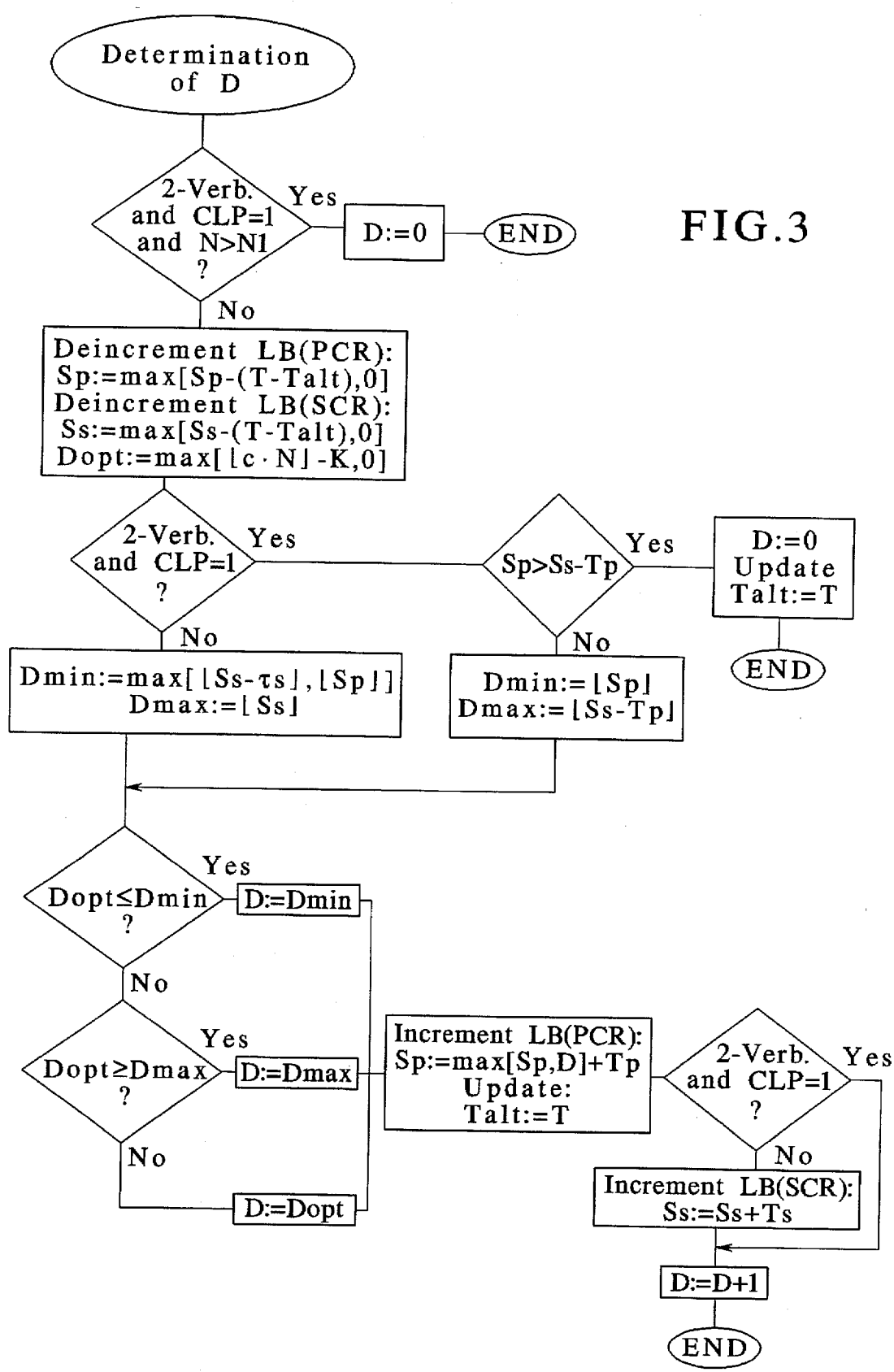

The afore-mentioned calculation of the delay time D by the leaky bucket manager LBM shall be set forth in greater detail below on the basis of an exemplary embodiment with reference to a flowchart shown in FIG. 3. For this purpose, let it be assumed as an example that two different types of VBR connections may occur, a high cell loss priority CLP=0 or a low cell loss priority CLP=1 being capable of being defined for their corresponding message cells. A first type of VBR connection, referred to as 1-connection below, is characterized during the course of the respective call setup by a peak bit rate Rp and an upper limit for the average bit rate Rs with a burst tolerance τs for the entire transmitted message cell stream, i.e. taking the message cells with the cell loss priorities CLP=0 and CLP=1 into consideration. A second type of VBR connection, referred to as a 2-connection, by contrast, is characterized by a peak bit rate Rp for the entire transmitted message cell stream and by the upper limit of the average bit rate Rs with a burst tolerance ds for message cells to be transmitted with high cell loss priority CLP=0.

Two leaky bucket parameter sets as well as two leaky bucket counters LB are kept in the leaky bucket manager LBM, namely one leaky bucket counter LB(PCR) for the peak bit rate as well as one leaky bucket counter LB(SCR) for the upper limit of the average bit rate. The functioning of such a leaky bucket counter is already known. Moreover, the leaky bucket parameters are defined, for example by ATM-Forum, "ATM User-Network Interface Specification", Sept. 1993. Beyond this, the leaky bucket manager LBM acquires the plurality N of VBR message cells momentarily contained in the handling means SH. This plurality N is thereby updated with every accepted or forwarded message cell. In addition thereto, an upper limit N1 is fixed for the plurality of VBR message cells having the low cell loss priority CLP=1.

With the appearance of a message cell, a determination is made on the basis of the VPI/VCI carried therein to see whether this message cell belongs to a 2-connection and CLP=1 and N>N1 is established at the same time. When this is the case, then a delay time D=0 is communicated to the cell buffer manager CBM, whereupon the message cell that has just been supplied is discarded. I.e., message cells of a 2-connection with CLP=1 are discarded in case many message cells belonging to VBR connections are already stored.

Otherwise, the momentary counter readings of the two leaky bucket counters LB(PCR) and LB(SCR) are respectively deincremented by a value (T−Talt), whereby T is the afore-mentioned, current time but Talt indicates the time at which a message cell for the connection coming into consideration had been most recently accepted. A new counter reading Sp=max[Spalt−(T−Talt),0] thus results for the leaky bucket counter LB(PCR). In a corresponding way, the leaky bucket counter LB(SCR) assumes a counter reading Ss=max [Ssalt−(T−Talt),0]. In both instances, thus only values $\geq 0$ are allowed. Beyond this, an optimum delay time Dopt= max[⌊cN−K⌋,0] is calculated, whereby c is a fixed constant (scheduling constant), N represents the afore-mentioned plurality of VBR message cells, and K represents a constant that is dependent on the allowable fluctuation in cell delay time. In the present exemplary embodiment, c is defined with c=1/(1−p), whereby p represents the overall load by the afore-mentioned PCR connections. ⌊x⌋ thus indicates the whole-numbered part of the value X.

A check is subsequently carried out to see whether the extant message cell belongs to a 2-connection and CLP=1 is established, i.e. that a low cell loss priority is present. When this is the case and the counter reading of the leaky bucket counter LB(PCR) is Sp≤Ss−Tp with Tp=1/Rp (peak bit rate), then a minimum delay time Dmin=⌊Sp⌋ and a maximum delay time Dmax=⌊Ss−Tp⌋ are defined.

When, by contrast, a counter reading Sp>Ss−Tp exists for the leaky bucket counter LP(PCR), then the cell buffer manager CBM is supplied with a delay time D=0 and the value Talt is set to the value T.

If the afore-mentioned interrogation implemented after the calculation of the optimum delay time Dopt shows that a 2-connection with CLP=1 is not present, then the minimum delay time Dmin is determined as Dmin=max[⌊Ss−τs⌋,Sp]. The maximum delay time Dmax, by contrast, is set to the value Dmax=⌊Ss⌋.

After the minimum and maximum delay times have been determined, a subsequent check is made to see whether the calculated optimum delay time Dopt lies between the minimum and maximum delay time Dmin and Dmax. When this is the case, the value D=Dopt is used as delay time D. Otherwise, the delay time D=Dmin is set given Dopt≤Dmin, or the delay time D=Dmax is set given Dopt≥Dmax.

After this, the counter reading of the leaky bucket counter LB(PCR) is incremented to the value Sp=max[Sp,D]+Tp and the time Talt is set to the value T. In the case when a 2-connection with CLP=1 is not present, moreover, the leaky bucket counter LB(SCR) is incremented to the value Ss=Ss+ Ts (with Ts=1/Rs (upper limit of the average bit rate)). I.e., the determination of the delay time for message cells with CLP=1 is mainly based on the peak bit rate for 1-connections.

In conclusion, the calculated delay value D is then set to the value D:=D+1, which is then supplied to the cell buffer manager CBM in the above-recited way for the further handling of a message cell present at the moment. The control events set forth with reference to FIG. 2 then repeat with every appearance of a further message cell.

What the setting of the delay time to the value D:=D+1 achieves, moreover, is that an arriving message cell is delayed at least by a time D=1, i.e. that this message cell is forwarded no earlier than in the next cell cycle. The handling of arriving message cells is thus decoupled from the handling of message cells to be forwarded.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for forwarding message cells supplied via at least one offering trunk by an ATM communication equipment unit working according to an asynchronous transfer mode during virtual connections to a serving trunk for a respective virtual connection and on which a periodically repeating time frame having a respective plurality of time slots is determined for forwarding of message cells, comprising the steps of:

determining characteristic parameters of the respective virtual connection during a call setup, a message cell stream of the respective virtual connection being defined by said parameters;

based on said characteristic parameters and on a number of message cells incoming and outgoing per unit time during the respective virtual connection, calculating a preferred individual time slot for every arriving message cell for the forwarding thereof;

inserting a respective message cell into an output list allocated to the preferred time slot;

successively selecting output lists allocated to the individual time slots for a forwarding of the message cell or message cells respectively contained therein;

respectively determining a peak bit rate as well as an upper limit for an average bit rate and a burst tolerance as characteristic parameters at least for a first type of virtual connection;

calculating a minimum delay time by which forwarding of a message cell that has just been supplied is at least delayed according to a number of message cells incoming and outgoing per unit time during the respective virtual connection, taking the peak bit rate into consideration;

calculating a maximum delay time by which the forwarding of a message cell that has just been supplied is to be at most delayed according to the number of message cells incoming and outgoing per unit time during the course of the respective virtual connection and taking the upper limit of the average bit rate into consideration; and determining a delay time and thus a time slot in which the corresponding message cell is to be forwarded taking the minimum and the maximum delay time into consideration.

2. A method according to claim 1 including the step of calculating the delay time as a whole number of time slots, and only forwarding a message cell when a delay time >0 has been calculated for it.

3. A method according to claim 1 including the steps of determining an optimum delay time from a value proportional to a number of message cells pending at the moment for forwarding;

considering this value when it lies in an interval between minimum and maximum delay time; and taking into consideration the minimum delay time given an optimum delay time that is less than or equal to the minimum delay time, or taking into consideration the maximum delay time given an optimum delay time that is greater than or equal to the maximum delay time.

4. A method according to claim 1 wherein:

in addition to the first type of virtual connection, having a second type and a third type of virtual connection proceed via the respective serving trunk;

defining a peak bit rate as a characteristic parameter for the second type of virtual connection;

defining characteristic parameters deviating from the first and second type of virtual connection for the third type of virtual connection; and forwarding message cells of the second type and third type of virtual connection without calculating a delay time, the virtual connections of the second type being given priority over the virtual connections of the first type for the forwarding of message cells and giving priority to the virtual connections of the first type over the virtual connections of the third type of virtual connection for the forwarding of message cells.

5. A system for forwarding message cells supplied via at least one offering trunk by an ATM communication equipment unit working according to an asynchronous transfer mode during virtual connections to a serving trunk for a respective virtual connection and on which a periodically repeating time frame having a respective plurality of time slots is determined for forwarding of message cells, comprising:

means for determining parameters characteristic of a respective virtual connection during the call setup, a message cell stream of the respective virtual connection being defined by said parameters;

means for calculating a preferred time slot for every arriving message cell for the forwarding thereof based on said characteristic parameters and on a number of message cells incoming and outgoing per time unit during the respective virtual connection;

means for inserting a respective message cell into an output list allocated to the time slot to be used;

means for successively selecting output lists allocated to the individual time slots for a forwarding of the message cell or message cells respectively contained therein;

means for outputting characteristic parameters for the respective virtual connection with respect to a peak bit rate as well as an upper limit for an average bit rate and a burst tolerance at least in a part of a subscriber equipment unit connected to the ATM communication equipment unit; and handling means allocated to the respective serving trunk for calculating a minimum delay time by which the forwarding of a message cell that has just been supplied is at least delayed according to a number of message cells incoming and outgoing per time unit during the respective virtual connection and taking the peak bit rate into consideration, said handling means also calculating a maximum delay time by which the forwarding of a message cell that has just been supplied is to be at most delayed according to the number of message cells incoming and outgoing per time unit during the respective virtual connection and taking the upper limit of the average bit rate into consideration, and said handling means determining a delay time and thus the time slot in which the corresponding message cell is to be forwarded taking the minimum and the maximum delay time into consideration.

6. A system according to claim 5 wherein said handling means calculates the delay time as a whole number of time slots, and for forwarding a message cell only when a delay time >0 has been calculated for it.

7. A system according to claim 5 wherein the handling means has first and second counter means available to it for each of the virtual connections, said first counter means acquiring the message cells incoming and outgoing per time unit, taking the peak bit rate into consideration, and said second timer means acquiring the message cells incoming and outgoing per time unit, taking the upper limit of the average bit rate into consideration, a momentary counter reading of both said first and second counter means being deincremented by a value T–talt upon appearance of a message cell, where T references current time and talt referencing a time at which a message cell of the respective connection most recently appeared;

means for calculating the minimum and the maximum delay time from the momentary counter readings of both counter means;

means for determining an optimum delay time from a value proportional to a number of message cells pending at the moment for forwarding said value being considered when it lies in an interval between the minimum and the maximum delay time; and means for taking into consideration the minimum delay time given an optimum delay time that is less than or equal to the minimum delay time, or taking into consideration the maximum delay time given an optimum delay time that is greater than or equal to the maximum delay time.

8. A system according to claim 5 including:

means for supplying to the handling means message cells of a second type of virtual connection that is respectively characterized by a peak bit rate and of a third type of virtual connection that is respectively characterized by characteristic parameters deviating at least partly from the first and second type of virtual connection;

respectively separate output queues for acceptance of message cells to be forwarded being allocated to the three types of virtual connection;

means for supplying message cells of the first type of virtual connection to the allocated output queue respectively according to the calculated delay time, and for supplying message cells of the second and third type of virtual connection directly to the respectively allocated output queue; and selection means connected to control the output queues such that at an output side, message cells of the second type of virtual connection have priority over message cells of the first type of virtual connection, and the message cells of the first type of virtual connection in turn have priority over message cells of the third type of virtual connection with respect to time-slot-wise forwarding.

* * * * *